Sept. 10, 1968  T. J. WRONA  3,400,625
MACHINE TOOL

Filed Sept. 14, 1966  7 Sheets-Sheet 1

INVENTOR
THEODORE J. WRONA
BY
Woodhams, Blanchard & Flynn
ATTORNEYS

INVENTOR
THEODORE J. WRONA
BY
Woodhams, Blanchard & Flynn
ATTORNEYS

Sept. 10, 1968     T. J. WRONA     3,400,625
MACHINE TOOL

Filed Sept. 14, 1966     7 Sheets-Sheet 3

INVENTOR
THEODORE J. WRONA
BY
Woodhams, Blanchard & Flynn
ATTORNEYS

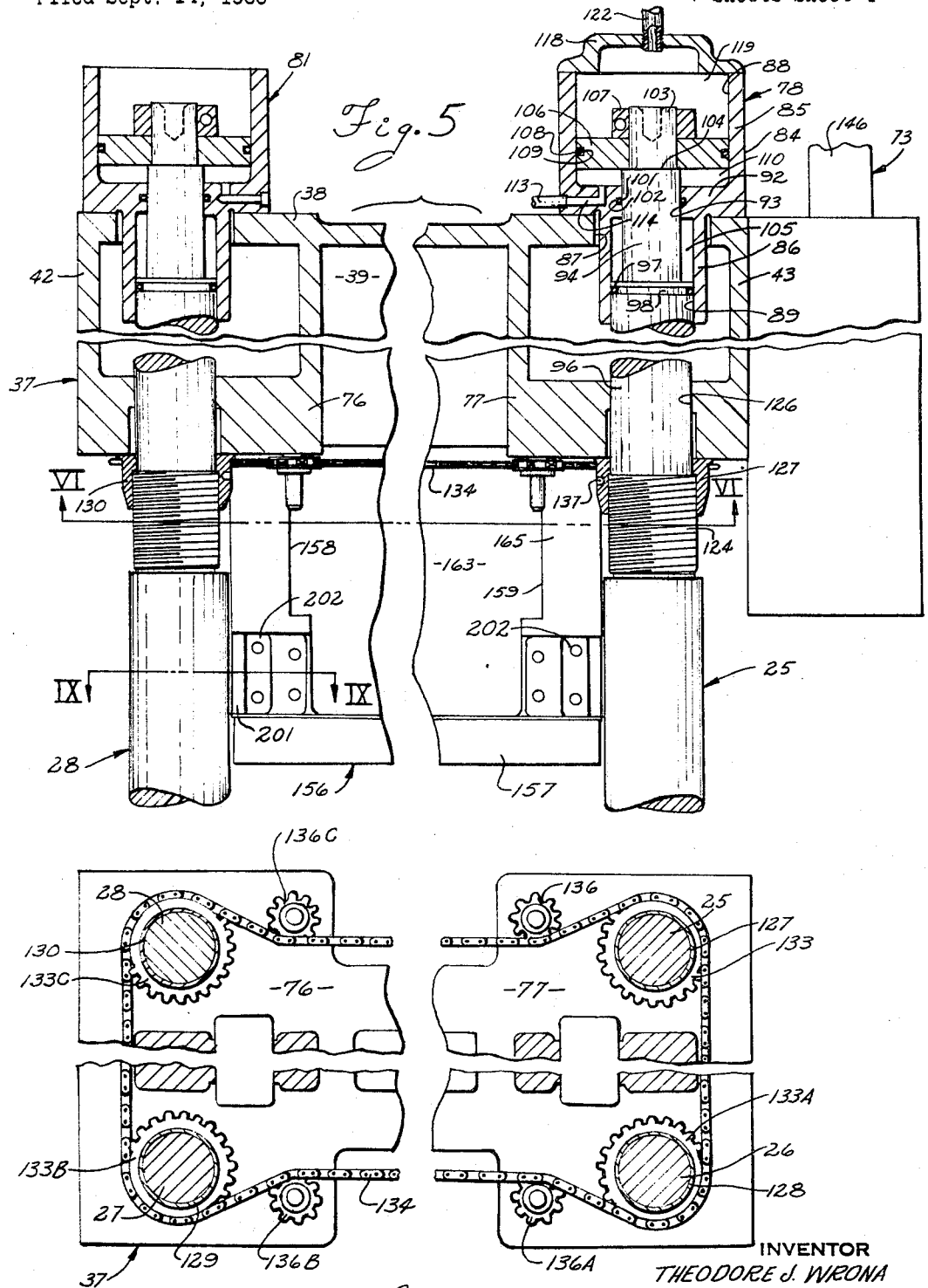

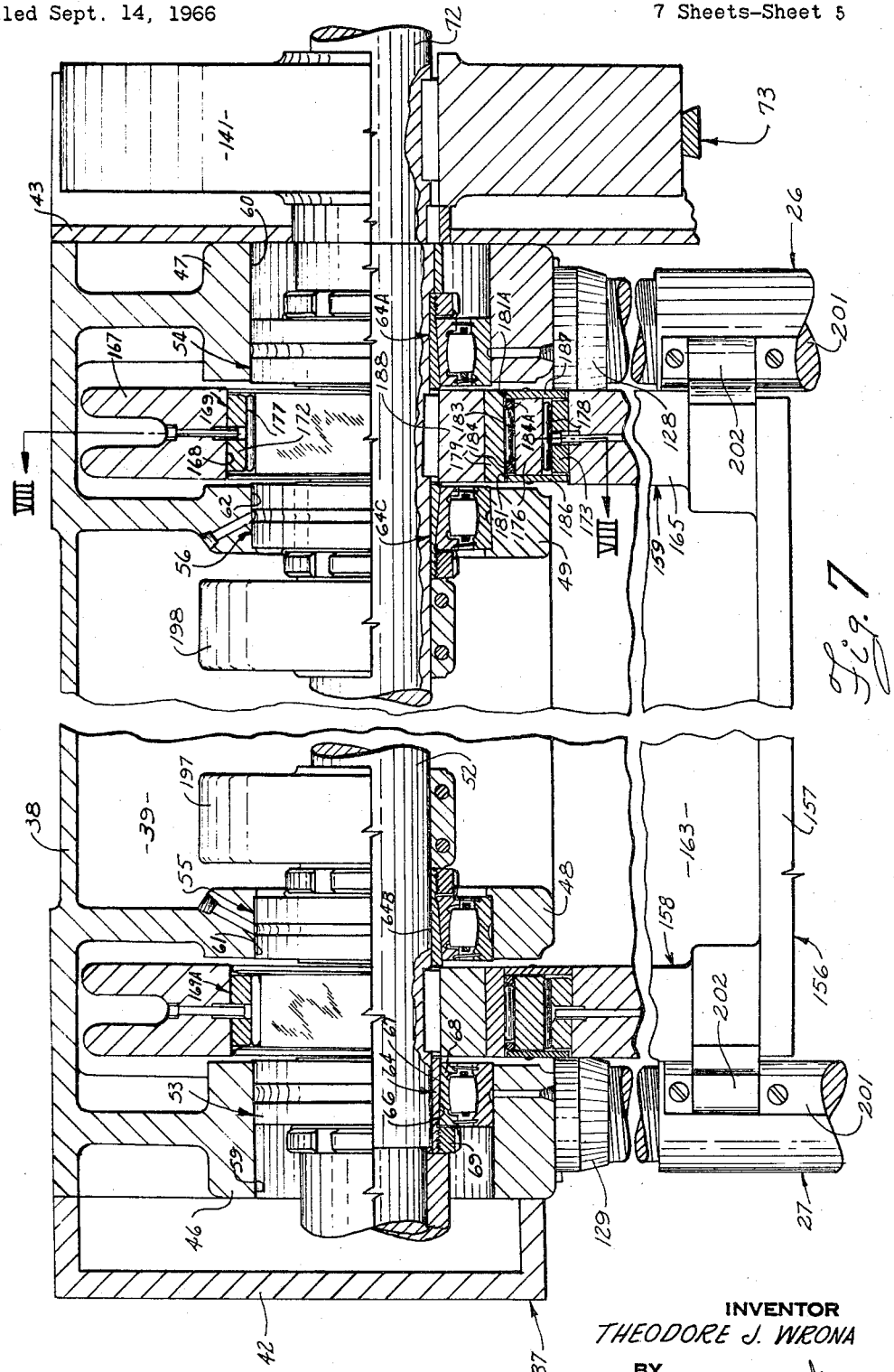

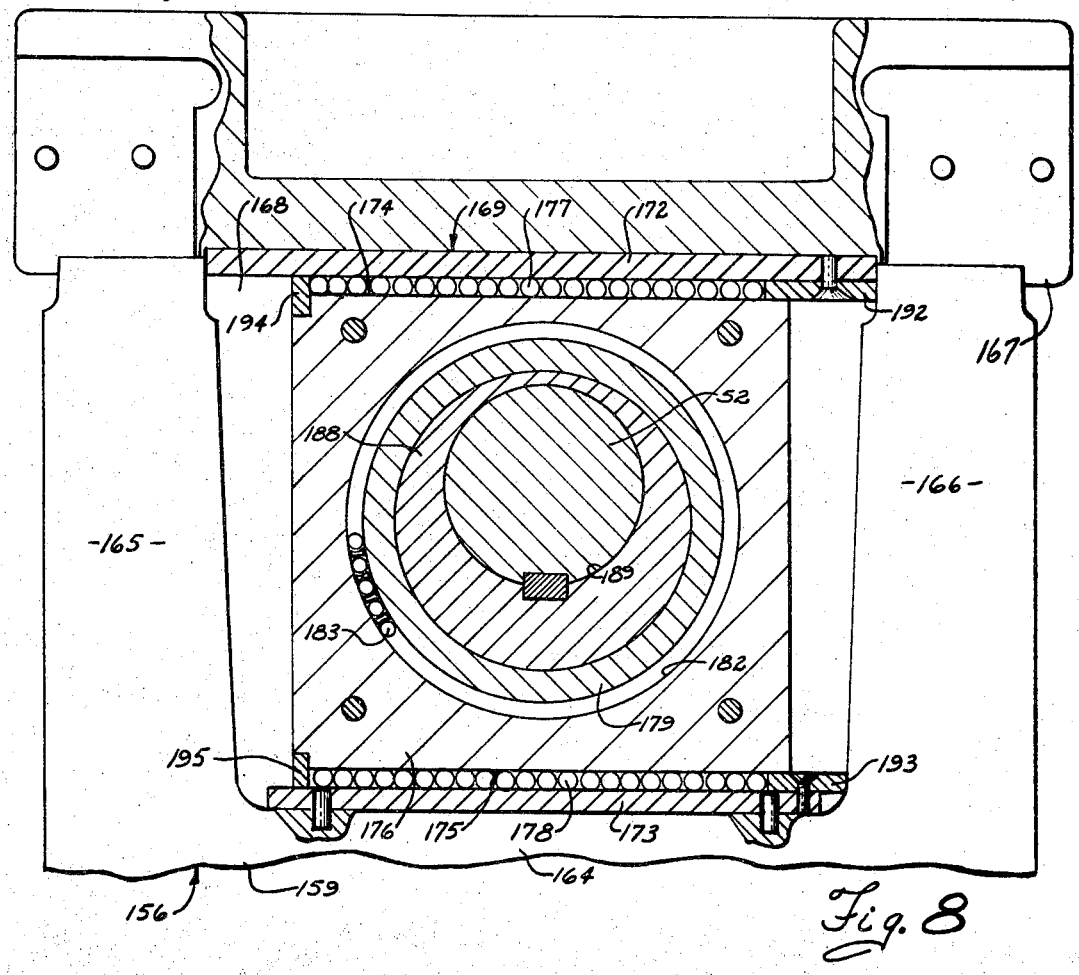
Fig. 8
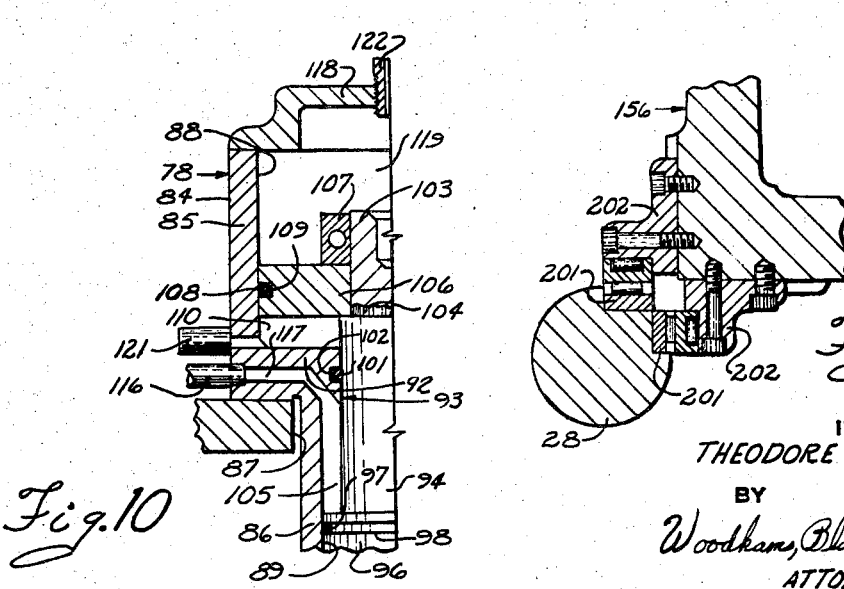
Fig. 10
Fig. 9
INVENTOR
THEODORE J. WRONA
BY
Woodhams, Blanchard & Flynn
ATTORNEYS

United States Patent Office 3,400,625
Patented Sept. 10, 1968

3,400,625
MACHINE TOOL
Theodore J. Wrona, Sturgis, Mich., assignor to Oak Products, Incorporated, Sturgis, Mich., a corporation of Michigan
Filed Sept. 14, 1966, Ser. No. 579,427
9 Claims. (Cl. 83—529)

This invention relates in general to a press for performing operations upon a workpiece and, more particularly, to a type thereof having both mechanical and hydraulic mechanisms for effecting relative movement of the die-supporting plates with respect to each other, said hydraulic mechanism being provided with extremely accurate adjustment means for limiting the movement thereof.

Presses, of the type used to punch openings in sheet material, have been in use for many years and, in general, have served their purposes well. However, previous punch presses, with which I have become familiar, are heavy, cumbersome, expensive and, they are not readily capable of fine adjustments which are frequently required particularly where the press is being used for relatively light-duty operations. Existing punch presses are designed primarily for heavy-duty operations, and changing of the dies for a different type of operation is difficult and requires a substantial amount of down time. Moreover, even though these presses are extremely heavy, the vibrations created by their rotating parts will cause them to move with respect to the floor during normal operation unless they are anchored to the floor or other supporting structure.

In previous punch presses utilizing a rotating shaft for effecting the reciprocal movement of the dies, it has been standard practice to use sleeve-type bearings for all or most of the rotating parts, in order to maintain the tolerances desired and, at the same time, withstand the radial forces to which the shaft might be exposed because of the heavy-duty capacity of the press. That is, even though the press might never be exposed to the heavy duty for which it was designed in all other respects, it was necessary to maintain this same design strength in the bearing structures and this was thought to require sleeve-type bearings.

In existing punch presses, it is sometimes necessary to separate the dies a greater distance than the normal stroke of the press permits in order, for example, to repair a die or extract a jammed workpiece from between the dies. However, in most existing punch presses, it is either difficult or impossible to separate the dies more than their maximum operational spacing without dismantling the press, or effecting a material change in the adjustment of the dies. Moreover, for the lack of accurate adjustment mechanism in the press, it is often difficult to readjust accurately the "shut height" of the dies after the maintenance has been performed. Presently, such adjustment is accomplished either by changing the positions of the dies with respect to their supporting platens, or by some adjustment of the platens both of which involve a slow, "cut and try" procedure.

Accordingly, the objects of the invention have been to provide:

(1) An improved press construction adapted for both light-duty and heavy-duty service, and having a movable die support operable by both pressure fluid and mechanical force, said movable die being supported upon shaft means which is entirely supported upon the head of the press by antifriction bearing means.

(2) A press construction, as aforesaid, wherein the two methods for moving the movable die can be carried out independently of each other to reciprocate the movable die with respect to the fixed die, such movement being cumulative, and wherein the pressure fluid actuated movement of the movable die toward the fixed die can be adjustably and positively limited with extreme accuracy by micrometer means which are an integral part of the press.

(3) A press construction, as aforesaid, wherein the fluid actuated mechanism is arranged and designed so that it compensates for disproportionate distribution of weight in the head of the press as it is raised and lowered by the fluid actuated mechanism.

(4) A press construction, as aforesaid, wherein the prime mover and guide means, whereby the movable die is reciprocated mechanically, are arranged so that the prime mover partially supports the overhung end of the shaft means effecting said mechanical actuated movement.

(5) A press construction, as aforesaid, wherein the movable die is supported by hanger means mounted upon the driving shaft and equipped with an improved bearing assembly which provides maximum strength and minimum vibration during normal operation of the press.

Other objects and purposes of the invention will become apparent to persons familiar with this type of equipment upon reading the following descriptive material and examining the accompanying drawings, in which:

FIGURE 5 is a broken sectional view substantially as taken along the line V—V in FIGURE 2.

FIGURE 6 is a broken, sectional view taken along the line VI—VI in FIGURE 1.

FIGURE 7 is a sectional view taken along the line VII—VII in FIGURE 2.

FIGURE 8 is a sectional view taken along the line VIII—VIII in FIGURE 7.

FIGURE 9 is a sectional view taken along the line IX—IX in FIGURE 5.

FIGURE 10 is a sectional view taken along the line X—X in FIGURE 3.

Figure 1:
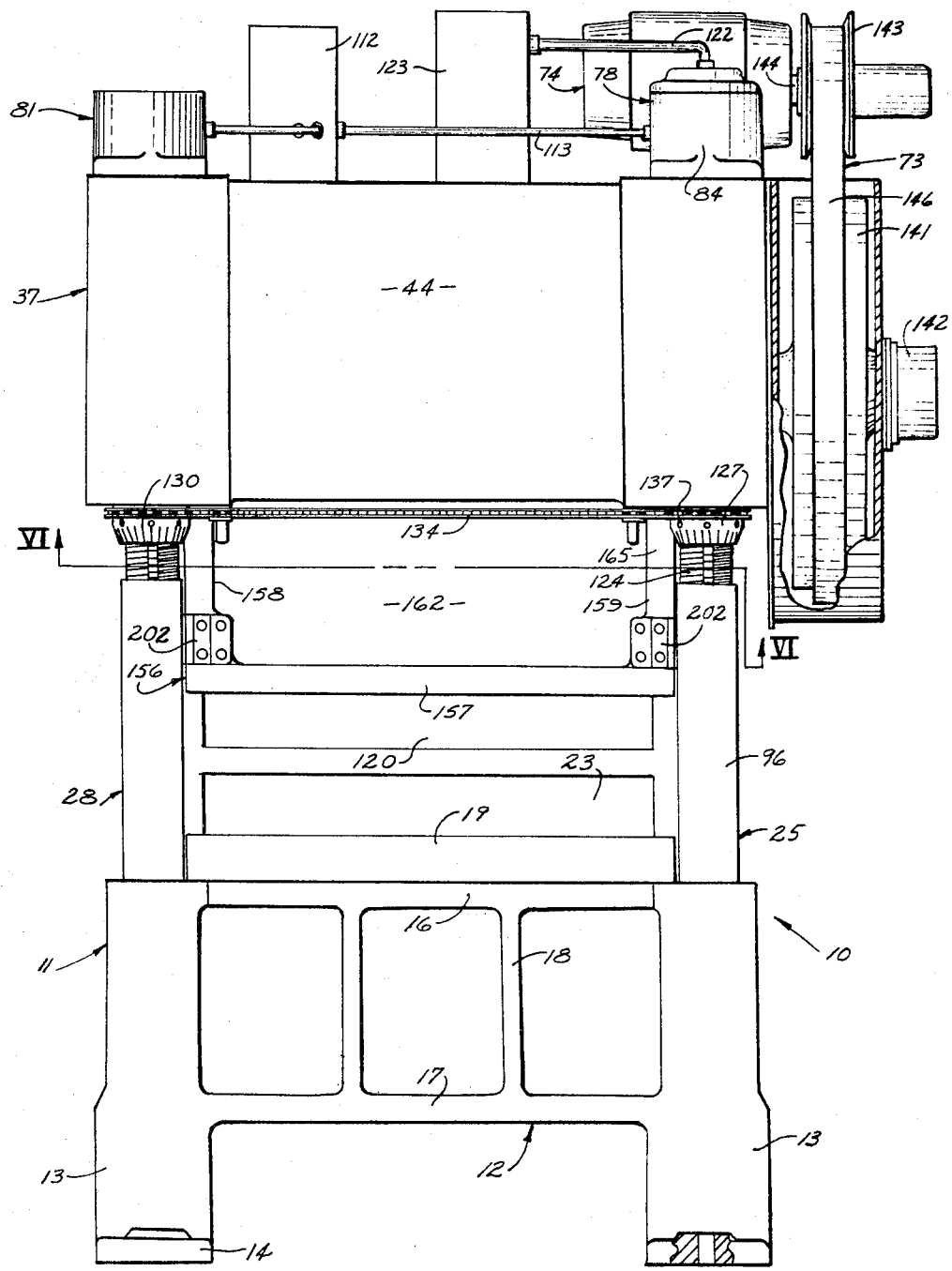
FIGURE 1 is a front elevational view of a press construction embodying the invention.

For convenience in description, the terms "upper," "lower," "front," "rear" and words of similar import will have reference to the press of the invention as appearing in FIGURE 1 which shows a front view of the press. The terms "inner," "outer" and derivatives thereof will have reference to the geometric center of said press and parts thereof.

GENERAL CONSTRUCTION

The objects and purposes of the invention, including those set forth above, have been met by providing a press which is preferably operated in an upright position and comprised of a base structure, a plurality of upright columns rigidly secured to said base structure and a head adjustably supported upon said columns for movement toward and away from the base structure. A drive shaft, which is supported on the head by antifriction bearings for rotation around a horizontal axis, is connected by drive means to a motor also mounted on said head. Pressure fluid actuated means are mounted upon said head and connected to the upper ends of said columns for effecting movement of said head along said columns and with respect to the base structure.

A stationary die is mounted upon the upper side of the base structure in a substantially conventional manner. A movable die is mounted upon an upper platen which is in turn supported by hanger means eccentrically connected to the drive shaft, so that rotation of the drive shaft effects vertical reciprocation of the upper platen. Adjustment means are mounted upon said columns between said head and said base structure for limiting the extreme accuracy the movement of the head toward the base structure, hence, the "shut height" of the upper die.

DETAILED DESCRIPTION

Figure 2:
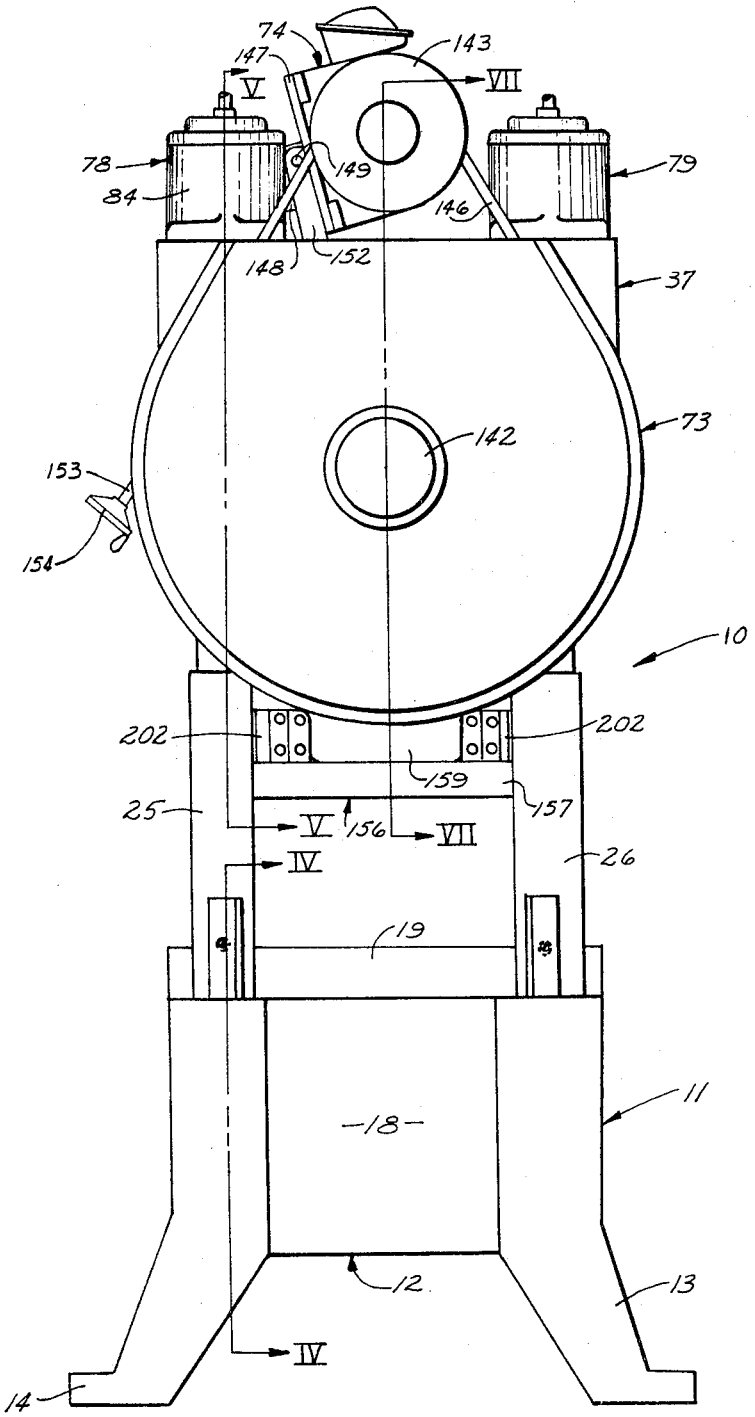
FIGURE 2 is a side elevational view of said press construction.
Figure 4:
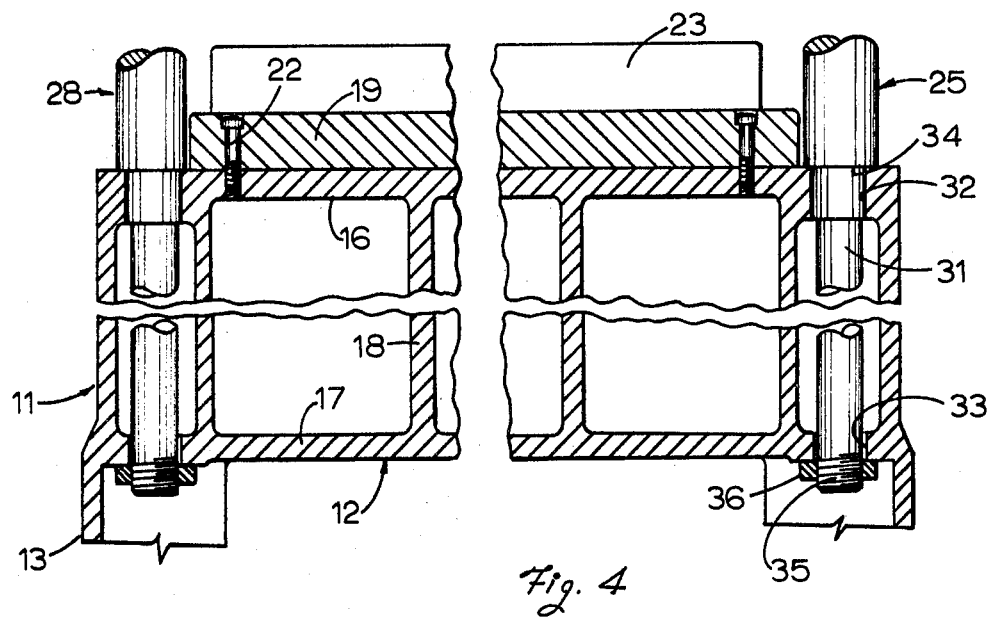
FIGURE 4 is a broken, sectional view taken along the line IV—IV in FIGURE 2.

The press 10 (FIGURES 1 and 2), which has been selected to illustrate a preferred embodiment of the invention, is comprised of a base structure or pedestal 11 having a substantially hollow platform 12 mounted upon and rigidly secured to four corner legs 13 having feet 14 which may be anchored upon a supporting surface in a substantially conventional manner. The platform 12 (FIGURE 4) includes spaced, upper and lower walls 16 and 17 interconnected by webs 18. A lower, stationary platen 19 is secured upon the upper wall 16 by means of bolts 22 for the purpose of supporting a lower die 23 in a conventional manner.

A plurality, here four, of upright columns 25, 26, 27 and 28 (FIGURE 6) are rigidly secured to and extend upwardly from the pedestal 11 (FIGURE 4) to define the four corners of a substantially rectangular pattern. Said columns are preferably, but not necessarily, substantially identical in shape and size. The column 25, by way of example, has a lower end portion 31 of reduced diameter which extends through appropriate openings 32 and 33 in the upper wall 16 and lower wall 17, respectively, of the platform 12. The shoulder 34 at the upper end of the reduced portion 31 bears against the upper surface of the wall 16 when the threaded lower end 35 of said reduced portion 31 extends below the lower wall 17 where it is threadedly engaged by a nut 36 whereby said platform 12 is clamped tightly between said shoulder 34 and said nut 36.

The columns 26, 27 and 28 have lower portions which extend downwardly through the platform 12 and are rigidly secured thereto in a manner substantially as set forth above with respect to the column 25.

Figure 3:
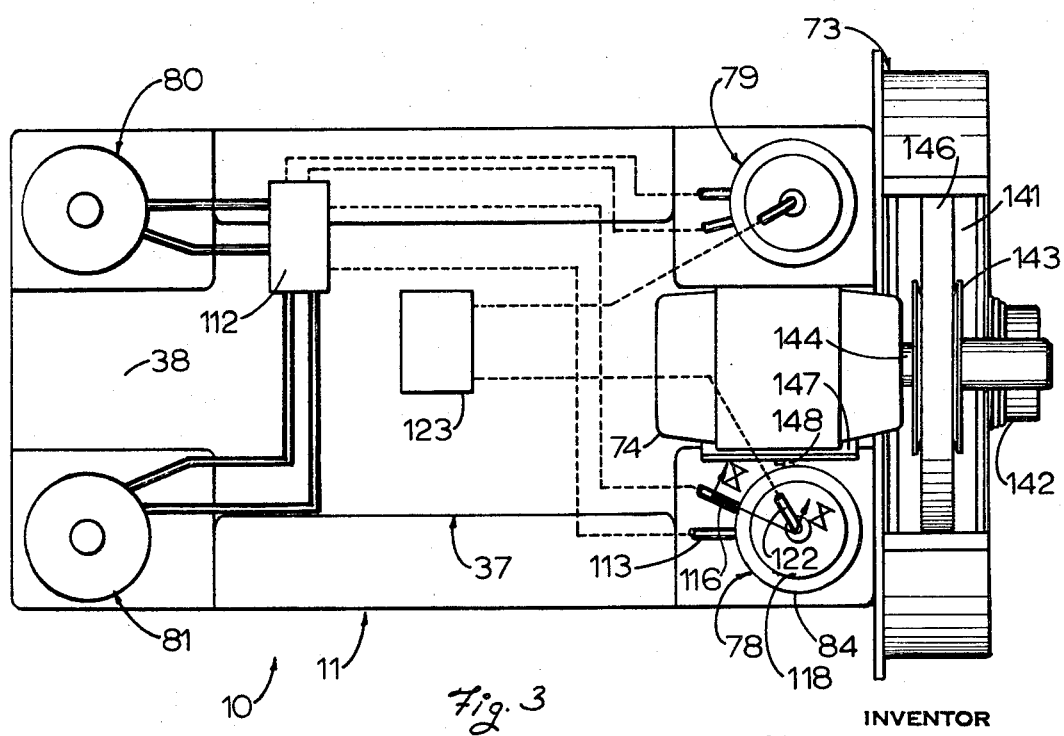
FIGURE 3 is a top view of said press construction.

The head or crown 37 (FIGURE 1) which is substantially rectangular in shape and hollow, includes a front wall 44, a top wall 38 (FIGURE 3), a rear wall 39 (FIGURE 7), and end walls 42 and 43 (FIGURE 5) which are rigidly secured to each other. A pair of spaced, outer bearing supports 46 and 47, and a pair of spaced, inner bearing supports 48 and 49 are rigidly secured to and between the walls 38 and 39, as shown in FIGURE 7, and the wall 44 (FIGURE 1). A main shaft or crankshaft 52 is rotatably supported by the antifriction bearings 53, 54, 55 and 56 (FIGURE 7) within coaxial openings 59, 60, 61 and 62 in the bearing supports 46, 47, 48 and 49, respectively.

The bearing 53 includes a retaining sleeve 64 which is supported upon the shaft 52 and has at its inner end a tapered outer surface 66 which corresponds with an inner tapered surface 67 on the inner race 68 of said bearing 53, in a substantially conventional manner. A lock collar 69 is threadedly supported upon the outer end of the retaining sleeve 64 for urging the adjacent, tapered surfaces of the inner race 68 and the retaining sleeve 64 into snug engagement with each other.

The bearings 54, 55 and 56 are mounted upon the shaft 52 by means of retaining sleeves 64A, 64B and 64C in a manner substantially as set forth above with respect to the bearing 53. However, it will be noted that the tapers in each pair of adjacent, inner and outer bearings converge away from their adjacent sides.

The rightward end 72 of the main shaft 52 extends beyond the right end wall 43 of the head 37 for engagement by the drive 73 which is connected to the motor 74 (FIGURE 1), both of which are discussed in detail hereinafter.

The head 37 has left and right, bottom wall sections 76 and 77 (FIGURE 6) which are rigidly secured to the adjacent bearing supports 46, 48 and 47, 49, respectively, and to the adjacent portions of the rear wall 39 and front wall 44. Four pressure fluid actuators 78, 79, 80 and 81 (FIGURE 3) are mounted upon the top wall 38 of the head 37 so that they are respectively coaxial with and connected to the upper ends of the columns 25, 26, 27 and 28 (FIGURE 6) respectively.

The pressure fluid actuator 78 (FIGURE 5), for example, is comprised of a cylindrical casing 84 having an upper portion 85 which is disposed above and is supported upon said top wall 38 so that it is concentric with the column 25. The casing 84 has a coaxial lower portion 86 which is of reduced diameter and extends downwardly through an opening 87 in the top wall 38. The upper portion 85 defines an upwardly opening chamber 88 and the lower portion 86 defines a downwardly opening chamber 89, which chambers are separated by a diametrically disposed midwall 92 having a concentric opening 93 therethrough.

The upper end of the column 25 has a first reduced portion 94 which is snugly but slideably received through the opening 93 in the midwall 92 when the central portion 96 of said column 25 is slideably and snugly disposed within the lower chamber 89. Sealing means, such as an O-ring 97, is received within an appropriate groove 98 near the upper end of the central portion 96 for effecting a liquid-tight seal between the inner wall of the chamber 89 and said central portion 96.

An O-ring 101 is received within a groove 102 in the midwall 92 for sealing engagement with the outer surface of the first reduced portion 94 on said column 25. Accordingly, the lower chamber 86 includes a variable capacity compartment which is sealed at both ends thereof by the O-rings 97 and 101.

The upper end of the column 25 has a second reduced portion 103 which is externally threaded and forms a shoulder 104 at its lower end. A piston 106 is sleeved upon the second reduced portion 103 and tightly held against the shoulder 104 by a nut 107 which is threadedly mounted upon the second reduced portion 103. The piston 106 is snugly but slideably disposed within the upper chamber 88 and has a peripheral groove 109 in which an O-ring 108 is disposed for effecting a liquid-tight seal with the casing 84. Thus, the upper chamber includes a variable capacity, lower compartment defined between the O-rings 101 and 108.

A source 112 of pressure fluid (FIGURE 3) is connected by the conduit 113 and the passageway 114 (FIGURE 5) in the midwall 92 to the lower compartment 110 of the upper chamber 88, said pressure fluid can cause the piston 106 and midwall 92 to be moved away from each other so that the head 37 is thereby moved toward the base structure 11. A conduit 116 (FIGURE 3) connects the source 112 to a passageway 117 (FIGURE 10) in the midwall 92 which communicates with the compartment 105 in chamber 89, whereby pressure fluid can cause the central portion 96 of the column 25 and the midwall 92 to move away from each other so that the head 37 is moved away from the base structure 11.

A cover 118 is secured to the upper end of the cylindrical casing 84 to provide an upper compartment 119 in the chamber 88 above the piston 106. A pipe 122, which communicates with the upper compartment 119, is connected to a source 123 (FIGURE 1) of pressure fluid, such as compressed air, which can be controlled for reasons appearing hereinafter. A pressure relief valve 121 (FIGURE 10) is connected to the lower end of the compartment 110 to prevent damage to the press or any part thereof which is associated with the movement of the head 37 and/or pressure member 156. That is, for example, if an oversized workpiece comes between the upper die 120 and lower die 23, so that the upper die cannot move into its normal "shut height" position, the abnormal pressure created between the dies will be transmitted to the pressure fluid, normally a liquid, in the compartment 110. The relief valve 121 is set to open when the pressure in the compartment reaches a value where damage could occur, thus acting as a safety device.

The pressure fluid actuators 79, 80 and 81 (FIGURE 3) and the associated upper portions of the columns 26, 27 and 28 (FIGURE 6), respectively, are preferably constructed and interconnected in a manner substantially identical with the foregoing description of the pressure fluid actuator 78 and column 25, except that the actuators 80 and 81 may not require connection to the source 123 of compressed air and, therefore, they may not require a cover correponding to the cover 118 on the actuator 78.

The central portion 96 of the column 25 (FIGURE 5) has an externally threaded portion 124 which extends along said column to a point substantially below the lower surface of the bottom wall section 77 when the piston 106 is closely adjacent the midwall 92. However, the threaded portion 124 can be slideably received upwardly into the lower enlarged portion of the opening 126 in the wall section 77 through which the column 25 extends.

An internally threaded collar 127 is threadedly mounted upon the threaded portion 124 of the column 25 for movement lengthwise thereof in response to relative rotation therebetween. Similar collars 128, 129 and 130 are mounted upon the threaded portions of the columns 26, 27 and 28, respectively, for simultaneous engagement by the lower surfaces of the bottom wall sections 76 and 77 (FIGURE 6). That is, the collars 127 and 128 engage the wall section 77 and the collars 129 and 130 engage the wall section 76 at the same time when their adjustment is correct.

A drive sprocket 133 is concentrically and rigidly secured to the collar 127, and similar sprockets 133A, 133B and 133C are rigidly secured to the collars 128, 129 and 130, respectively, in radial alignment with each other. Said sprockets are engaged by a chain 134 which is held under tension against said drive sprockets by the idler sprockets 136, 136A, 136B and 136C.

At least one of said drive collars, such as the collar 127 (FIGURE 5) has a plurality of radially disposed openings 137 into which an instrument, such as a rod, can be inserted for the purpose of facilitating rotation of said collar around the column 25. In view of the interconnection of said collars by the chain 134, rotation of the collar 127 effects simultaneous and corresponding rotation of the collars 128, 129 and 130. The pitch of the threads in the collars 127, 128, 129 and 130 is sufficiently small that a small rotational movement of said collars effects an extremely small movement of the collars lengthwise of their respective columns. Accordingly, the low limit of movement of the head 37, in response to operation of the pressure fluid actuators 78, 79, 80 and 81, can be adjusted in extremely small and accurate increments.

The drive 73 (FIGURES 1 and 7) is comprised of a flywheel 141 supported upon the rightward end of the main shaft 52 for rotation with respect thereto. The clutch 142, which may be of a conventional friction type which is electrically controlled, effects driving connection between the flywheel 141 and the main shaft 52. The motor 74 may be of a conventional type having an adjustable pitch pulley 143 supported upon the shaft 144 thereof. A belt 146 extends around the pulley 143 and the flywheel 141 which is preferably rotated continuously during normal operation of the press.

The motor 74 (FIGURE 2) is mounted upon a support plate 147 which is in turn pivotally connected to a bracket 148 by means of the pivot pin 149, said bracket 148 being rigidly secured to the casing 84 of the actuator 78. A lever 152 is secured to the support plate 147 and engaged by a screw 153 which is supported for rotation upon the head 37 and has at its lower end a hand crank 154. Rotation of said crank 154 pivots said support plate 147, hence said motor 74 around the pivot pin 149, whereby the tension on the belt 146 can be increased or decreased for one or both of two different reasons. That is, said tension can be increased to the extent to which the motor helps to support the flywheel 141 and/or for the purpose of permitting a change in the pitch diameter of the pulley 143. However, the tension of the pulley must also be adjusted if it is desired to produced just one or the other of these two results.

Figure 11:
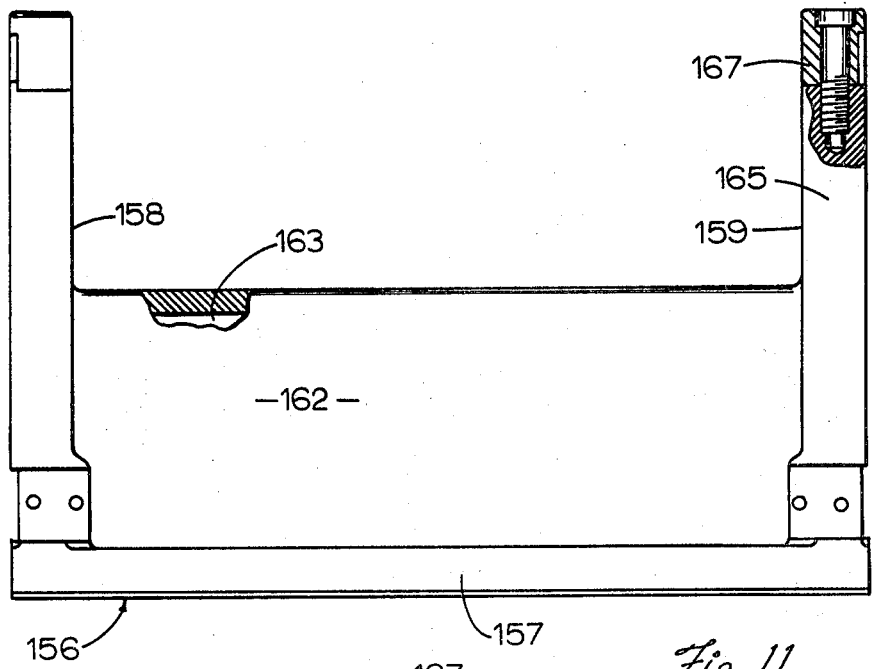
FIGURE 11 is a side view of the movable die support.
Figure 12:
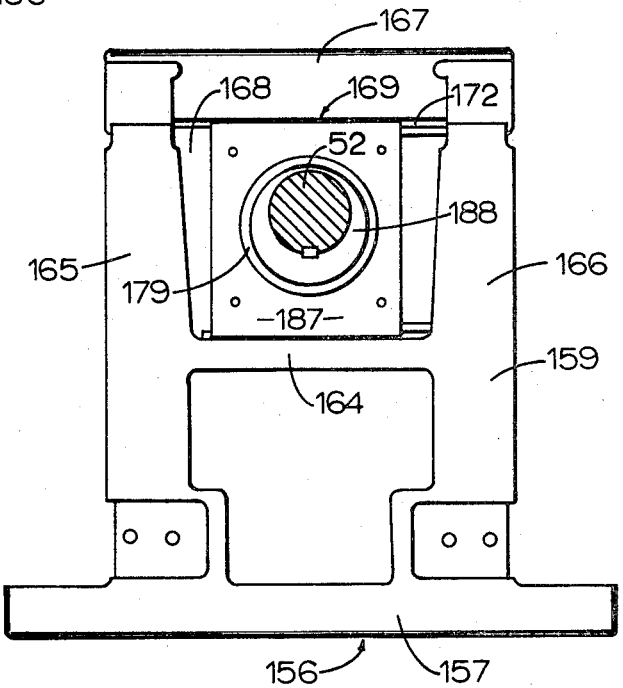
FIGURE 12 is an end view of said movable die support.

The pressure applying member 156 (FIGURES 7, 11 and 12) is comprised of a horizontally disposed, bottom plate 157 having upstanding hangers 158 and 159 rigidly secured to and extending upwardly from the opposite ends of said bottom plate. Said hangers are interconnected by front and rear brace walls 162 and 163, which are also rigidly secured to the bottom plate 157.

The hanger 159 (FIGURE 12), which is preferably a mirror image of the hanger 158, has a pair of spaced, upwardly extending support posts 165 and 166 which, as shown in FIGURE 8, are disposed upon opposite sides of the main shaft 52 and are rigidly interconnected between their upper and lower ends by the crossbar 164. Said posts are rigidly secured at their upper ends to a cap member 167 near the opposite ends thereof, thereby defining with the cap member 167 and the crossbar 164 a substantially rectangular opening 168 into which the bearing assembly 169 is received.

The structure including the hanger 159 and the bearing assembly 169 (FIGURE 8) contains elements similar to those found in an arrangement sometimes referred to as a "Scotch yoke." Applicant's improved adaptation of this arrangement includes a pair of hardened strips 172 and 173 which are secured, respectively, to the lower surface of the cap member 167 and the upper surface of the crossbar 164 of the hanger 159. A rectangular outer race 176, having parallel upper and lower surfaces 174 and 175, respectively, is disposed between the hardened strips 172 and 173 which also have parallel opposing surfaces. A plurality of bearing rollers 177 and 178 are disposed, respectively, along the upper surface 174 and lower surface 175 of said outer race for engagement by the hardened strips 172 and 173, respectively.

A substantially conventional inner race 179 (FIGURE 8) is rotatably supported within the cylindrical opening 182 in the outer race 176 by means of bearing rollers 183 which are preferably held in proper position by the retainers 184 and 184A (FIGURE 7). A pair of substantially rectangular side plates 186 and 187 are disposed upon opposite sides of the hardened strips 172 and 173, the bearing rollers 177 and 178, the outer race 176 and the bearing rollers 183. Said side plates 186 and 187 have coaxial, central openings 181 and 181A, respectively, into which the opposite ends of the inner race 179 extend.

The inner race 179 is tightly sleeved upon an annular member 188 having an eccentric opening 189 into which the main shaft 52 is snugly received. The annular member 188 is preferably both shrunk and keyed upon the main shaft 52. Accordingly, rotation of the shaft 52 effects upward and downward movement of the bearing assembly 169 as well as sideward movement thereof. Since the pressure applying member 156 is positively held against sideward movement, in a manner discussed hereinafter, the sideward movement urged by the eccentric 188 is absorbed by relative sideward movement between the bearing assembly 169 and the hanger 159.

Fixed alignment blocks 192 and 193 are rigidly secured to the rearward ends of the hardened strips 172 and 173, respectively, so that they are engageable by the rearwardmost ones of the bearing rollers 177 and 178, respectively. A pair of front alignment blocks 194 and 195 are rigidly secured to the frontward end of the outer race 176 closely adjacent the hardened strips 172 and 173, respectively. The quantity of bearing rollers 177 between the alignment blocks 192 and 194 is carefully selected so that, when the outer race 176 is in its rearwardmost position, adjacent ones of said bearing rollers 177 are substantially contiguous, one against the other, the frontwardmost and rearwardmost of said rollers being in engagement with the alignment blocks 192 and 194, respectively. The lower bearing rollers 178 are similarly arranged between the alignment blocks 193 and 195. Accordingly, with each 360 degree rotation of the main shaft 52, hence with each complete cycle of horizontal reciprocation of the bearing assembly 169, the bearing rollers 177 and 178 are realigned in parallel relationship, if such is required, thereby preventing a serious misalignment and jamming of said bearing rollers in the assembly 169.

The hanger 158 and its associated bearing assembly 169A may be and preferably are constructed in substantially the same manner as the hanger 159 and bearing assembly 169 described in the foregoing paragraphs. As shown in FIGURE 7, the hanger 159 with its bearing assembly 169 is disposed between the outer bearing 54 and inner bearing 56, whereas the hanger 158 and its bearing assembly 169A is disposed between the outer bearing 53 and inner bearing 55.

A pair of counterweights 197 and 198 are rigidly mounted upon the main shaft 52 between the inner bearings 55 and 56 so that the throw of said counterweights is diametrically opposite the throw of the eccentrics in the bearing assemblies 169 and 169A, whereby the main shaft 52 is dynamically balanced. It has been found during actual operation of a press, which is rated at 60 tons according to accepted practice in the trade and fabricated according to the foregoing description, that the main shaft 52 can be rotated in excess of 350 r.p.m. without creating any outwardly evident vibration, even though the press is not anchored to the surface upon which it is supported.

As shown in FIGURES 5 and 9, the column 28 has a guide slide 201 extending lengthwise thereof adjacent the front edge of the hanger 159. Said slide 201 is slidably engaged by a guide element 202 rigidly secured to the lower end of said hanger 158 adjacent the bottom plate 157. Similar guide slides and guide elements are mounted between the other three columns and corresponding adjacent portions of the hangers 158 and 159 whereby the vertical reciprocating movement of the pressure applying member 156 is accurately controlled and positively denied a horizontal component.

OPERATION

Broadly speaking, the normal operation of the press 10 may be noticeably similar to the operation of existing presses, wherein the lower platen is fixed and the upper platen is reciprocated toward and away from the lower platen. However, a number of distinctions will be found in applicant's press when its "shut height" is adjusted or when its relatively low cost and smoothness of operation are compared with existing presses.

Since the main shaft 52 is supported for rotation entirely within antifriction bearings, the frictional losses during normal operation are substantially less than those found in corresponding machines of the same general type and for the same general purpose, but using conventional sleeve bearings. Accordingly, the load imposed upon the motor 74 is less and the resultant cost of operation is less than the corresponding values in prior presses. The bearing assemblies 169 and 196A in the hangers 159 and 158, respectively (FIGURE 7), also reduce frictional losses and provide improved performance over existing equipment of the same general character.

During normal operation of the press 10, after it has been set up, the head 37 will be supported upon all four of the collars 127, 128, 129 and 130 so that the loads supported by the columns are as uniform as reasonably feasible. During such operation, a constant positive pressure is maintained within the lower compartments 110 of the upper chambers 88 (FIGURE 5) in each of the pressure fluid actuators 78, 79, 80 and 81 so that the head 37 cannot move upwardly when the pressure applying member 156 is moved downwardly to perform a punching or stamping operation. However, in order to avoid damage to the press, in the event that an excessive pressure is developed between the dies, the relief valve 121 is set at a value which will relieve the pressure in the compartments 110 when a predetermined value thereof is exceeded. Thus, the pressure fluid system serves not only as a means of effecting a fast upward and downward movement of the head 37, but also as a safety device to protect the dies 23 and 120, the head 37 and the associated movable parts.

The head 37 can be moved upwardly a relatively large distance in a short period of time by directing the pressure fluid from the source 112 into the compartment 105 in the chamber 89 of each of the pressure fluid actuators, and simultaneously exhausting the fluid from the compartments 110. This will cause the head 37 to move upwardly from said collars 127 to 130 and thereby separate the dies 23 and 120 a substantial distance from each other. Of course, in order to get the maximum spacing between the dies 23 and 120, the main shaft 52 must be rotated until the eccentrics 188 in the bearing assemblies 169 and 169A reach their top dead center positions. In one embodiment, the eccentrics 188 produce a throw of about 1.5 inches, and the pressure fluid actuators can increase this throw to about 4.5 inches.

If it is desired to adjust the "shut height" of the upper die, such can be easily and quickly effected by rotating one of the collars 127 to 130, and the chain and sprocket arrangement which interconnects the collars will effect simultaneous rotation of the other collars. The head 37 can then be moved downwardly by the pressure fluid system into its position against and upon the collars for the purpose of checking the height of the upper die. Where a liquid is used, this movement can be effected slowly and carefully to avoid damage to the dies.

Due to the fact that the motor 74 and drive 73 are both located at the rightward end of the head 37 (FIGURE 5), their weight would normally tend to rack the head 37 with respect to the columns 25, 26, 27 and 28 as the head is moved upwardly and downwardly along said columns. However, to compensate for this tendency, a pressure fluid, such as compressed air, is connected to the upper compartment 119 in the pressure fluid actuator 78 and to a corresponding compartment in the pressure fluid actuator 79. A constant pressure is maintained in the two compartments 119 at a value which compensates for said weight of the motor and drive. That is, the pressure in compartments 119 augments the hydraulic pressure in the compartments 105 of the actuators 78 and 79 when the head 37 is being raised by the hydraulic system. Also, the pressure in compartments 119 opposes the flow of fluid into the compartments 110 of the actuators 78 and 79 when the head 37 is being lowered by the hydraulic system. The augmentation and opposition produced by the pressure in the compartments 119 is carefully balanced against the force of gravity upon the motor and drive.

It has been found that the rigidity of the over-all frame structure of the press 10 coupled with the antifriction support of the main shaft and virtually eliminates any chance for the movable die to become "stuck on bottom." That is, there is so little deflection and/or stretch in the parts of the press which produce the compressive force that the full load capacity of the press is achieved during a relatively small circumferential movement of the flywheel when the eccentrics 188 are adjacent their "bottom dead center" positions. Thus, if the press is capable of performing a given punching operation in the first instance, the inertia of the flywheel will carry the upper die through the punching oepration and prevent a seizure or "stuck on bottom" condition thereof.

Moreover, as a result of the characteristics set forth in the foregoing paragraph, the press 10 can be caused to maintain closer tolerances and perform more efficiently than existing competitive presses. For example, the press 10 can be adjusted to produce partial cuts in controlled amounts through sheet material. Also, the cutting or punching operation can be performed without a "drop through" or telescoping of the punch and die, which tends to reduce the useful life thereof. Such telescoping normally results from a lack of capacity for adjusting the press or from the fact that parts of the press are deflected or otherwise distorted during the compression stroke of the crankshaft, and the press must be adjusted accordingly. Thus, when the punch penetrates the workpiece, the distorted parts of the press are released and they can drive the punch into the die.

The press 10 can perform a punching or other forming operation when the upper die is moved either mechanically or hydraulically. Thus, a prompt and accurate determination of the load requirements for a given operation can be determined by operating the press hydraulically and observing a pressure gauge connected to the hydraulic system thereof. This procedure minimizes the chance of operating the press beyond its rated limits.

Because of the cumulative effect which the hydraulic and mechanical mechanisms can produce in opening the dies, the press 10 can serve the dual purpose of a conventional "try-out" press, which is too slow for production work, as well as a production press.

The overhung flywheel 141 tends not only to deflect the right end 72 of the shaft 52 downwardly, but also to deflect the central portion of said shaft (between the inner bearings 48 and 49) upwardly. Such latter deflection could adversely affect the performance of the member 156 and the accuracy of the press. However, by placing the motor 74 directly above the shaft 52, the normal tendency for the shaft 52 to be deflected toward the motor by the drive 73 is used to oppose the contrary deflection urged by the flywheel.

Although a particular preferred embodiment of the invention has been set forth above for illustrative purposes, it will be recognized that variations or modifications of such disclosure, which come within the scope of the appended claims, are fully contemplated.

The embodiments of the invention in which an exclusive property or privilege is claimed are defined as follows:

1. A machine for applying a force to a workpiece, comprising:
   base means having a workpiece supporting structure on one side thereof and plural parallel guide members mounted on said base means and extending substantially perpendicularly away from said side thereof;
   head means mounted upon said guide members and spaced from said supporting structure, said guide members being rigidly secured to one of said base means and said head means and being slideably engaged with the other;
   adjustment means mounted upon each of said guide members for controlled movement toward and away from the rigidly secured one of said base means and head means, and for engagement by the slideable one of said head means and base means for positively limiting the movement of said slideable one toward said secured one;
   pressure fluid actuated means connected between each of said guide members and said slideable one for firmly holding said slideable one against said adjustment means;
   pressure applying means located opposite said side of said base means;
   shaft means supported by said head means for rotation around an axis transverse of the direction of movement of said adjustment means; and
   eccentric means connecting said pressure applying means to said shaft means for effecting reciprocation of said pressure applying means toward and away from said side of said base means in response to rotation of said shaft means.

2. A press, comprising:
   base means having an upper, supporting surface;
   a plurality of elongated, spaced and parallel guide members secured to said base means and extending upwardly therefrom near said surface;
   head means slideably supported upon said guide members for movement toward and away from said surface;
   adjustment means mounted upon said guide members for movement lengthwise thereof, said adjustment means being engaged by said head means for positively limiting movement of said head means toward said base means;
   pressure fluid actuated means connected between said head means and the upper ends of said guide members for moving said head means lengthwise of said guide members and firmly holding said head means against said adjustment means;
   shaft means supported by said head means for rotation around an axis substantially perpendicular to the lengthwise extent of said guide members;
   pressure applying means located between said shaft means and said surface; and
   eccentric means connecting said pressure applying means to said shaft means whereby rotation of said shaft means effects reciprocal movement of said pressure applying means toward and away from said surface.

3. A press according to claim 2, including motor means supported by said head means above said shaft means, and drive means connecting said motor means to said shaft means for effecting said rotation thereof;
   wherein die means are secured upon said pressure applying means and upon said supporting surface in opposed cooperating relationship for performing an operation upon a workpiece disposed therebetween; and
   wherein said pressure-fluid actuated means comprises a plurality of hydraulic cylinders mounted upon said head means and having pistons secured to the upper ends of said guide members, and a source of pressure fluid connected to each of said cylinders.

4. A press according to claim 2, including electric motor means mounted upon said head means above said shaft means; and
   drive means connecting said motor means to said shaft means, said drive means including a flywheel mounted upon said shaft means for rotation with respect thereto, clutch means for selectively connecting said flywheel to said shaft means, pulley means mounted upon said motor means, and belt means connecting said pulley means to said flywheel, said pulley means being located directly above said flywheel so that said flywheel is partially supported by said motor means acting through said pulley means and said belts means.

5. A press according to claim 2, including motor means mounted upon said head means, a flywheel mounted upon said shaft means, and drive means connecting said motor means to said shaft means;
   wherein there are four guide members arranged to define a rectangle; and
   wherein said pressure fluid actuated means comprises four hydraulic cylinders, each cylinder being associated with the upper end of a guide member and being comprised of a cylindrical casing concentric with a said guide member and a piston secured to the upper end of said guide member and disposed within said casing to define upper and lower pressure compartments upon the upper and lower sides, respectively, of said piston, said lower compartment being connected to a first source of fluid having a controlled, variable pressure for raising and lowering said head means, and said upper compartment being connected to a second source of fluid under substantially constant pressure so that said second fluid counterbalances the effects of gravity upon said motor, said drive means and said flywheel when the casing is moved with respect to the piston.

6. A press according to claim 2, wherein said guide members have radially aligned threaded portions;

wherein said adjustment means comprises a plurality of internally threaded collars, each collar being threadedly supported upon the threaded portion of a guide member between said head means and said base means, each of said collars having an integral concentric sprocket thereon, said sprockets being radially aligned;

chain means extending around and engageable with each of said sprockets for effecting the simultaneous rotation of said collars in response to linear movement of said chain means; and means for effecting said linear movement of chain means.

7. A structure according to claim 2, wherein said head means includes two pairs of spaced bearing supports, and bearing means mounted in said supports for rotatably and concentrically supporting said shaft means near the ends thereof; and wherein said eccentric means includes a pair of spaced, similar hanger means rigidly secured to said pressure applying means and extending upwardly and respectively between said pairs of bearing supports, said eccentric means being crank means including bearing means supported upon said shaft means and engaged with said hanger means for effecting said reciprocal movement.

8. A press according to claim 2, wherein said shaft means is rotatably supported within said head means by two pairs of spaced, main bearing means;

wherein said pressure applying means includes hanger means rotatably supported upon said shaft means by eccentric bearing means; and wherein said main bearing means and said eccentric bearing means are of the antifriction type.

9. A press according to claim 2, wherein said guide members comprise four substantially cylindrical posts arranged in a rectangle;

wherein each of said guide members has an elongated guide surface thereon parallel with the lengthwise axis thereof; and wherein said pressure applying means has four guide elements secured thereto and engaged respectively and simultaneously with said guide surfaces for controlling accurately the reciprocal movement of said pressure applying means.

References Cited
UNITED STATES PATENTS 2,757,731  8/1956  Musly _____ 83—527
2,946,234  7/1960  Jahnke _____ 83—527 X JAMES M. MEISTER, *Primary Examiner*.